United States Patent [19]

Williams

[11] Patent Number: 5,108,810

[45] Date of Patent: Apr. 28, 1992

[54] COMPOSITE ELEMENT

[75] Inventor: Dennis J. Williams, Derbyshire, United Kingdom

[73] Assignee: Courtaulds, PLC, London, United Kingdom

[21] Appl. No.: 512,028

[22] Filed: Apr. 13, 1990

Related U.S. Application Data

[63] Continuation of Ser. No. 38,283, Apr. 14, 1987, abandoned.

[30] Foreign Application Priority Data

Apr. 16, 1986 [GB] United Kingdom ............... 8609224
Mar. 9, 1987 [GB] United Kingdom ............... 8705435

[51] Int. Cl.⁵ ........................... D04C 1/00; E04B 1/28
[52] U.S. Cl. .............................. 428/36.1; 52/309.16; 87/9; 156/393; 428/188
[58] Field of Search ............ 428/36.1, 36.2, 188, 428/116, 72, 73; 52/309.13, 309.16, 785, 808; 156/393; 87/8, 9

[56] References Cited

U.S. PATENT DOCUMENTS

| | | | |
|---|---|---|---|
| 2,029,048 | 1/1936 | Atwood | 52/808 |
| 3,284,849 | 11/1966 | Coleman et al. | 425/384 |
| 3,574,104 | 4/1971 | Medler | 52/309.16 |
| 4,223,053 | 9/1980 | Brogan | 428/116 |
| 4,559,862 | 12/1985 | Case et al. | 87/8 |
| 4,665,678 | 5/1987 | Müller et al. | 428/188 |
| 4,719,837 | 1/1988 | McConnell et al. | 87/30 |

FOREIGN PATENT DOCUMENTS

719238 10/1965 Canada .................. 52/808
847483 7/1949 Fed. Rep. of Germany .

Primary Examiner—James J. Seidleck
Attorney, Agent, or Firm—Davis Hoxie Faithfull & Hapgood

[57] ABSTRACT

A composite element comprising a reinforcing fabric framework comprising at least one assembly of separate tubular fabric formations bonded in an impregnating synthetic resin material.

26 Claims, 4 Drawing Sheets

COMPOSITE ELEMENT

This is a continuation of co-pending application Ser. No. 07/038,283, filed on Apr. 14, 1987, now abandoned.

TECHNICAL FIELD

This invention relates to a composite element, that is an element comprising reinforced material impregnated with or embedded in a matrix of a synthetic resin.

Composite elements comprising fabric (which constitutes reinforcing material) impregnated with synthetic resin are known, but the present invention is based on the discovery that a composite structural element is conveniently achieved if the fabric framework comprises an assembly of separate, tubular fabric formations which may be interconnected or interengaged with one another so that they are assembled together to form a fabric framework. Such a composite structural element may have energy-absorbing properties comparable with, or better than, those of soft steel box girders or tubes.

SUMMARY OF THE INVENTION

According to the present invention, a composite element is constituted by a fabric framework impregnated with synthetic resin and comprising at least one assembly of separate tubular fabric formations.

The invention also consists in a method of making a composite element comprising making a number of stiff or semi-stiff separate tubular fabric formations, assembling the said tubular fabric formations together to constitute a fabric formation, applying synthetic resin to the fabric framework and curing the synthetic resin.

The stiff or semi-stiff separate tubular fabric formations may be made by impregnating the separate tubular fabric formations with a synthetic resin and curing or partly curing the synthetic resin.

The tubular fabric formations, or some of them, may be interconnected or interengaged with one another and the composite structural element may also include fabric in sheet form and/or continuous filaments or staple fibres embedded in a synthetic resin matrix. The staple fibres may be in the form of threads and the term "filamentary element" is used in this specification to indicate such threads or continuous filaments. The composite structural element may further include an element or elements of a material other than fabric which may serve to interconnect tubular fabric formations.

Advantageously, at least some of the separate tubular fabric formations are parallel to one another in the composite element.

Further if the composite element includes fabric in sheet form and/or continuous filaments or staple fibre embedded in a synthetic resin matrix, such inclusions may be used to interconnect the tubular fabric formations of the composite element. In one aspect of the present invention, a useful arrangement of this type comprises a layer of fibres embedded in a synthetic resin matrix which is connected, preferably by a resin bonding, to a contiguous layer comprising at least one assembly of separate tubular fabric formations. The fibres are preferably continuous filaments which extend in the layer so as to lie adjacent to a plurality of the tubular fabric formations in the contiguous layer of the assembly.

In a preferred arrangement, a layer comprising an array of substantially parallel continuous filaments embedded in a synthetic resin matrix is connected to a contiguous layer comprising at least one assembly of separate tubular fabric formations arranged with the axes of the tubular fabric formations in substantially parallel disposition such that the continuous filaments extend in the layer transversely of the axes of the tubular fabric formations in the contiguous layer and lie adjacent to a plurality of said tubular fabric formations. In such an arrangement, the array of continuous filaments may be in the form of a tape, band or sheet of continuous filaments which may have been pre-impregnated with curable resin as in a pre-impregnated tape. The array of continuous filaments may also be the successive windings of a continuous filament which is wound around the contiguous layer of assembled tubular fabric formations by the process known as filament winding. In this process, liquid resin is usually applied to the filament prior to winding so that when the wound layer of filaments has been formed, the resin is in place ready to be cured.

More than one layer of fibres embedded in a synthetic resin matrix may be employed. A plurality of laminates may be built up to give improved structural properties by having differing fibre alignment in successive layers. For example, in the case of filament winding referred to, a cross-band mode of winding may be used in which the wound filament turns in successive layers of wound filaments may be at equal and opposite angles to the axis of rotation of the body being wound. Staple fibre threads or lengths of fabric in sheet form may also be wound in this way.

A preferred arrangement which employs more than one layer of fibres embedded in a synthetic resin matrix is a sandwich construction in which the aforesaid assembly of separate tubular fabric formations lies between layers of fibres embedded in a synthetic resin matrix. The assembly of tubular fabric formations may be in an annular configuration of circular or non-circular cross-section, with the fibre layers lying on each side of it being of a complementary configuration. Such fibre layers are suitably of a filament-wound construction. A filament-wound sandwich construction of this type may be formed by filament winding an inner layer of continuous filament windings on a mandrel, assembling a plurality of separate tubular fabric formations into an annular configuration on said inner layer, filament winding an outer layer of continuous filament windings around the tubular fabric formations, applying synthetic resin to the filaments at a suitable stage for constituting a matrix for the filament layers and subsequently curing the resin.

The filament-wound layers may be formed by winding a continuous filament in which case the filament is preferably pre-coated with liquid resin or the layers may be formed by winding a pre-preg tape of filaments. The presence of liquid resin on the outer surface of the inner filament-wound layer facilitates assembly of the separate tubular fabric formations on that surface. For example, a number of square-cross-section braided fabric tubes may be positioned in an annular configuration on the surface of the inner, filament-wound layer with the walls of adjacent tubes touching and with the axes of the tubes parallel to each other and to the axis of the winding mandrel. The liquid resin holds the tubes in position whilst the outer filament-wound layer is formed around them and bonds the layers together when the resin is subsequently cured. Diffusion of liquid resin from the filament-wound layers between the confronting side walls of the fabric tubes may also serve to bond the tubes together but if necessary, additional resin may be provided for that purpose. For example the tubes may be pre-coated with liquid resin prior to assembly in annular configuration or adjacent tubes may be interleaved with strips of resin in film-form.

Advantageously, the separate tubular fabric formations used in the composite elements of the invention may be braided fabric tubes which are held in a desired cross-sectional shape by an applied size material. A partly-cured resin size which is compatible with the matrix resin is particularly suitable. Tubes of square cross-sectional shape have been referred to. Other suitable geomteric shapes which facilitate assembly into a composite element according to the invention having structural properties are triangular, rectangular, rhomboid, hexagonal and circular cross-sections.

The tubular fabric formations preferably are made using fibres or filaments having good reinforcing properties. Reinforcing fibres and filaments include those made from glass, carbon, graphite, boron, silicon carbide and high performance aromatic polymers such as 'Kevlar'. Such reinforcing fibres and filaments are also preferred for the layers of fibre embedded in a synthetic resin matrix which is connected to the contiguous layer of the assembly of tubular fabric formations. For some applications where the reinforcement duty is less critical, fibres and filaments more notable for another desirable property such as flame-retardance may be used. 'Nomex' fibres are such an example.

In another aspect of the present invention a composite element is constituted by a fabric framework impregnated with synthetic resin and comprising a tubular fabric formation which is disposed so that at least one part of the tubular formation lies against at least one other part of the tubular formation so that the parts form an assembly.

The parts of the tubular fabric formation lying against one another can be regarded as individual tubular fabric formations which are separate from one another in the lateral direction although connected longitudinally in that they are parts of the same tube.

A composite element of this type may be formed, for example, by taking a continuous tubular fabric formation such as a braided fabric tube set in a square cross-sectional shape and winding it around a mandrel using the filament-winding technique referred to earlier. Adjacent turns of the wound tube lie against each other and together constitute an assembly which is a fabric framework in annular form. Such an assembly may comprise the "filling" of the sandwich construction described previously, lying between inner and outer filament-wound "skins" of fibre-reinforced resin.

BRIEF DESCRIPTION OF THE DRAWINGS

The invention will be further described, by way of example, with reference to the accompanying drawings in which.

DESCRIPTION OF PREFERRED EMBODIMENTS

Each of the composite structural elements illustrated in FIGS. 1 to 6 comprises a fabric framework 10 embedded in a synthetic resin so that the composite element consists of a matrix of synthetic resin 11 (shown in broken lines in FIG. 2) having embedded in it a fabric framework 10. Each fabric framework 10 includes initially separate tubular fabric formations 15.

Figure 1:
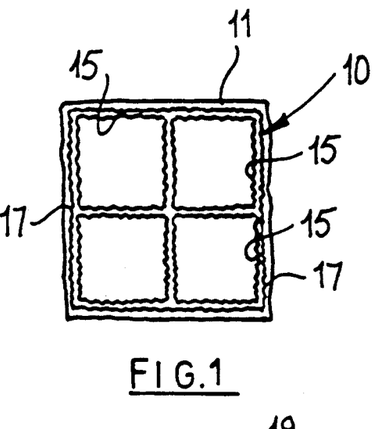
FIGS. 1 and 3 to 6 are cross sections through five composite elements according to the invention each incorporating a different fabric framework.
Figure 2:
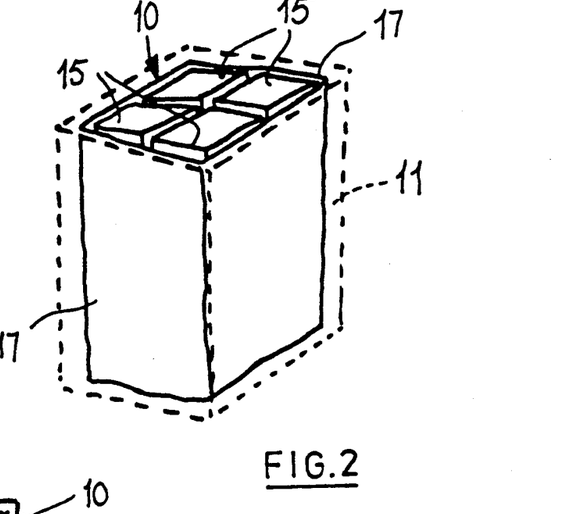
FIG. 2 is a perspective view of the composite element of FIG. 1, represented as if the synthetic resin matrix of the composite element were transparent, FIG. 7 consists of two elevations of a separate coherent tubular formation from a fabric framework of a composite structural element according to the invention, one showing the element before destructive testing and the other showing, schematically, the element after destructive testing.

Thus, the composite element of FIGS. 1 and 2 has a fabric framework 10 consisting of an assembly of separate tubular fabric formations 15 of square cross-section enveloped in a fabric or other tube 17. The tubular fabric formations 15 are juxtaposed and parallel to one another so that the walls of the tubular fabric formations are in contact or close proximity and are in contact or close proximity with the wall of the outer tube 17. The tube 17 if of fabric, may be woven, or weft-or warp-knitted. It may also be made of metal or a synthetic plastics material. Besides being interconnected by means of the surrounding tube 17, the tubular fabric formations 15 are interconnected by resin bonding as described below.

By describing the tubular fabric formations as "separate" is meant that each tubular fabric formation is capable of a separate existence whilst still maintaining the configuration of a tube. Thus, the tubular formations 15 in FIG. 1 are originally separate from one another and the composite element of that Figure is produced by assembling the four formations 15 together with an outer tube 17 and embedding the assembly in a synthetic resin.

The term "structural element" will be used in this specification to mean an element which is capable of playing a load-bearing function in a structure, for example as part of a motor vehicle or aircraft, as opposed to a function as a piece of cladding or covering material. In particular, a structural element is capable of resisting destructive breakdown of a structure of which it forms a part and will absorb enerqy when destructive breakdown takes place showing a stress-strain curve similar to that shown in broken lines in FIG. 8 and as discussed further below.

The separate tubular fabric formations of the composite element of FIGS. 1 and 2 or that of FIGS. 3, 4, 5 or 6 (or of the other embodiments of the invention) may be filled with synthetic resin or may be left empty. In the latter case, the composite element comprises a block of synthetic resin reinforced with a fabric framework and having apertures extending through it defined by the tubular fabric formations of the fabric framework.

The synthetic resin used in making the composite structural element according to the invention may, for example, by a polyester resin, an epoxy resin, a phenolic resin, a synthetic rubber or a polyurethane.

The tubular fabric formations used in composite structural elements according to the invention may be woven or knitted or may comprise non-woven fabric or they may, advantageously, be produced by the technique known as "braiding", which is defined in "Textile Terms and Definitions", seventh edition, published by The Textile Institute, Manchester, England, 1975 as "The process of interlacing three or more threads in such a way that they cross one another and are laid together in diagonal formation."

Advantageously, in manufacturing the fabric framework of a composite element according to the invention, the tubular fabric formations are first produced and formers are introduced into them. To render them stiff or semi-stiff, they are lightly impregnated with a synthetic resin which is the same as or compatible with the resin to be used in the final impregnation of the structural element and which may then be partly or completely cured. The stiffened tubular fabric formations are then assembled together, if appropriate by insertion in a tube 17 (which may be similarly stiffened and shaped prior to this operation). Finally, after colocation of a number of assemblies, if necessary, the fabric framework thus formed may be subjected to a heavier impregnation of synthetic resin or is embedded in resin, if desired by placing the framework in a mould into which the resin is introduced. However, the initial impregnation of the separate tubular fabric formation may be sufficient to produce the final product and the initial cure would then be carried out to an extent causing only the degree of stiffness required for assembly and curing would be completed after assembly without need for further impregnation.

One or more sheets of fabric or other material may be incorporated in a composite element according to the invention. Alternatively, or in addition to such sheets, reinforcement in the form of continuous filaments or staple fibre, possibly in threadform, may be incorporated in the composite element.

The composite elements shown in FIGS. 1 to 6 all comprise tubular fabric formations which are square in cross-section, but tubular fabric formations with other cross-sections, for example, triangular, rectangular, rhomboid, hexagonal and circular, may be used.

Figure 3:
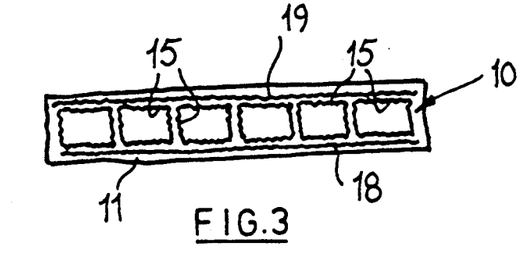

In the composite element of FIG. 3, the fabric framework 10 is constituted by a number of tubular fabric formations arranged in a straight row to form a layer comprising an assembly of tubular fabric formations and sandwiched between two pieces of sheet material 18 and 19 constituting components of two further layers in the composite element. Initially the tubular fabric formations may be interconnected by being secured to one of the pieces 18 of sheet material or alternate tubular fabric formations may be secured, for example by an adhesive, to one of the pieces of sheet material and the intermediate tubular fabric formations may, initially, be secured to the other piece of sheet material so that the fabric framewok 10 of the composite element of FIG. 3 is built up by juxtaposing the pieces of sheet material 18 and 19 so that their respective tubular fabric formations are in interdigitated relationship before the fabric framework is embedded in synthetic resin (11). Thus, this composite element comprises a layer of tubular fabric formations which are interengaged and located between two layers (or "skins") reinforced with fabric in sheet form, and/or continuous filaments, and/or staple fibres and contiguous with the layer of tubular fabric formations. The embedding resin connects the reinforcements of the three layers together by resin bonding.

The composite element of FIG. 3, which may constitute a panel (like the composite elements of FIGS. 9 and 10 described below) may be flat or curved. In the latter case, the layers (or skins) mentioned will have a curved configuration.

Figure 4:
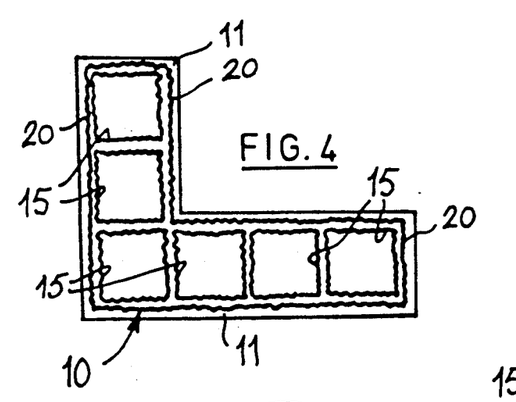

In the composite element of FIG. 4, square section tubular fabric formations 15 are assembled by enveloping them in a tubular surround 20, which is L-shaped in cross-section, before embedding them in synthetic resin. The tubular surround 20 may comprise reinforcement including fabric in sheet form or filamentary elements not formed into a fabric, as is the case with similar components of other composite elements to be described.

Figure 5:
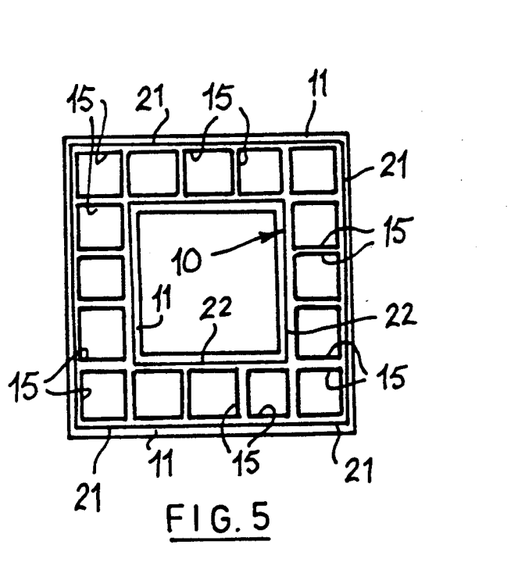

In the composite element of FIG. 5 square section tubular fabric formations 15 are assembled by enveloping them in a tubular surround 21 which is of square cross-section. The tubular fabric formations are arranged adjacent to walls of the surround 11 and within the square arrangement of tubular fabric formations 15 thus formed is located a further square section tube 22. The whole square section arrangement is embedded in synthetic resin leaving the centre free of synthetic resin and thus forming a tubular composite element.

Figure 6:
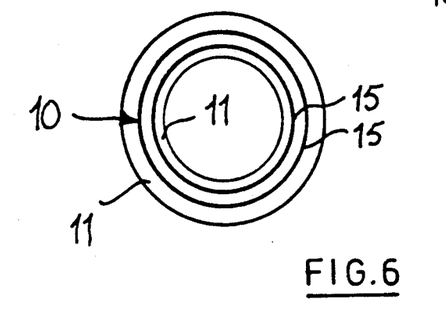

A composite element according to the invention may comprise a fabric framework consisting of two interengaged tubes one of which is located within the other as illustrated in FIG. 6 which shows one circular section tubular fabric formation 15 within another circular section tubular fabric formation, the pair being embedded in a synthetic resin block 11. In this way, and by adding further tubular fabric formations, a composite element can be made which has a fabric framework with a substantial wall thickness, in excess of that normally to be expected from a single fabric. A multi-walled assembly of tubular fabric formations can be incorporated in a fabric framework with similar assemblies or with assemblies made of single walled tubular fabric formations.

Each of the composite elements shown in FIGS. 1 to 6 comprises only a single assembly of tubular fabric formations but composite elements may include a plurality of such assemblies. For example, an assembly of tubular fabric formations as shown in FIGS. 1 and 2 may (if of the correct size) be located within the assembly of tubular fabric formations shown in FIG. 5 and a plurality of assemblies of tubular fabric formations as shown in FIG. 3 may be located adjacent one another to form a multi-layer fabric framework.

A composite element according to the invention may be formed to serve as panelling or cladding or as a load bearing element. It may also be so constituted, by choice of fabric and the nature and quantity of synthetic resin used in the manufacture of the composite element, that it constitutes a structural element capable of serving as an energy absorbing material when subjected to stress acting along the longitudinal direction of tubular formations in the structural element.

Figure 7:
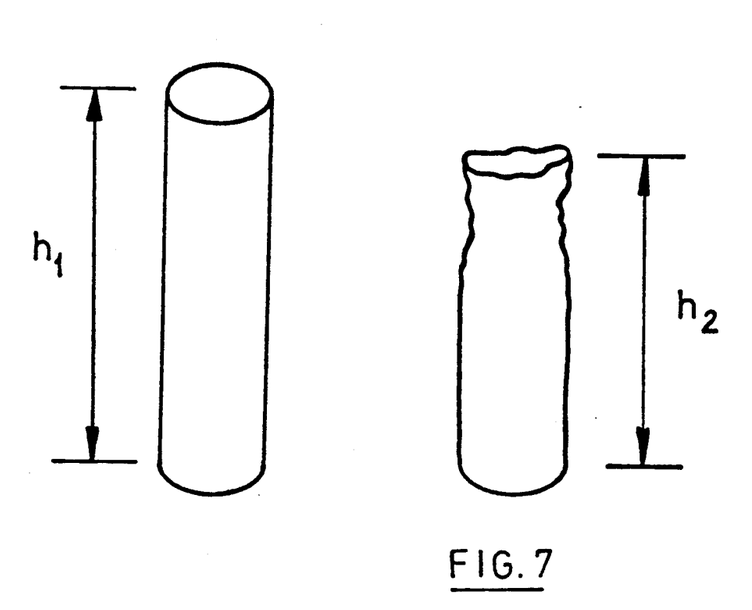
Figure 8:
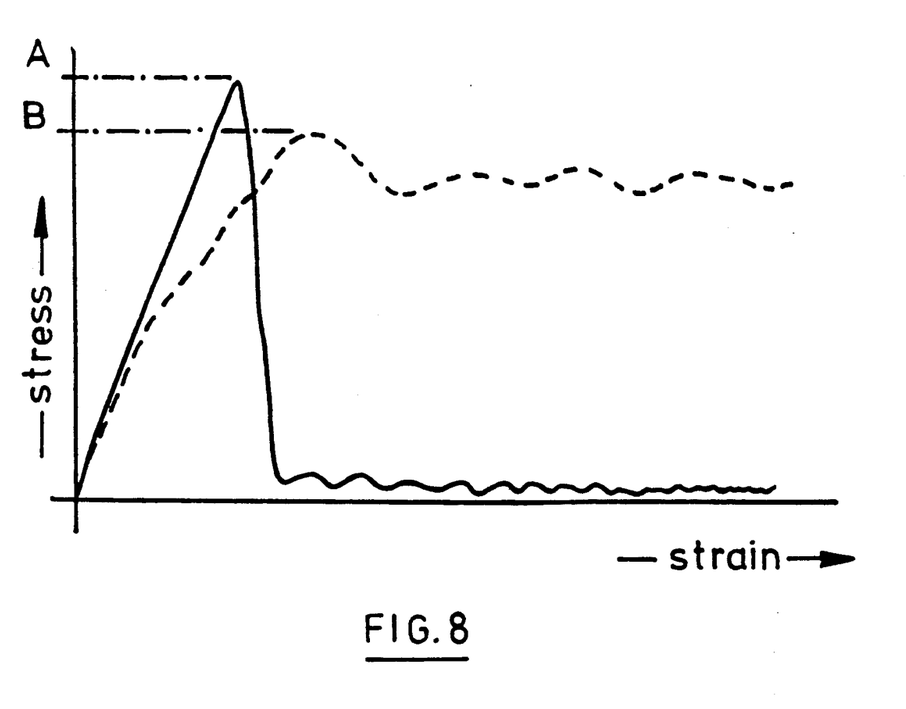
FIG. 8 is a graph illustrating a typical stress-strain curve of known composite elements and a typical stress-strain curve of a composite structural element according to the invention.

For example, some known composite materials have stress-strain curves like that shown by a full line in FIG. 8. They resist stress up to a maximum stress value A and then break down completely. Composite structural elements according to the invention, however, have stress-strain curves (when subjected to stresses along the longitudinal direction of their tubular fabric formations) like that shown by the broken line in FIG. 8, in which the stress rises to a maximum value B and thereafter falls very little (perhaps by less than 5% or 10%) which indicates that the composite structural element as a whole maintains its integrity although some part of it may undergo irreversible deformation destroying the original structure. In this, composite structural elements according to the invention are akin to metallic structures such as circular section tubes or box girders subjected to stresses acting along the longitudinal direction of the tubes or girders. Such structures can be categorised by their specific energy absorption when subjected to crushing forces which bring about their irreversible deformation. Thus, a tubular fabric formation in a composite structural element according to the invention, or a metal tube, as illustrated in FIG. 7 when crushed by a force acting longitudinalyy of the tubular formation, or tube, may deformed as illustrated, its height decreasing from $h_1$ to $h_2$. In suffering this deformation, the tubular fabric formation, or tube, will absorb energy. If the original, linear density of the tubular formation, or tube is d, the crushing operation involves the deformation of a weight of $(h_1-h_2) \times d$ of the original structure. The energy absorption can thus be characterised as energy absorbed divided by $(h_1-h_2) \times d$ in joules/g. Typically, soft steel structures will show an energy absorption of 25 joules/g and known composite materials a much lower figure. Composite structural elements according to the invention normally show an energy absorption higher than 10 joules/g and often as high as 20 or 25 joules/g and may show even higher energy absorption figures above 30 or 40 joules/g, for example up to 80 joules/g.

The separate tubular fabric formations 15 in an assembly of tubular fabric formations in a composite element according to the invention are advantageously in contact with one another and, when enveloped in a surrounding tube, with the inner surface of the tube 17. Further, they are advantageously adhesively secured to one another, for example by synthetic resin, after impregnations therewith as described below. (In this respect the drawings which show the tubular fabric formations 15 as spaced from one another are diagrammatic and intended to emphasise the individually coherent nature of the tubular fabric formations.) The square cross-section can be advantageous in that it brings the inner surface of a surrounding tube, for example tube 17 in FIG. 1 into close contact with the adjacent surfaces of tubular formations 15 and brings considerable areas of adjacent tubular fabric formations 15 into contact with one another and thus promotes intimate bonding of the tubular fabric formations and the tube by the synthetic resin.

The braiding process produces a tubular fabric formation having a size which lies between close tolerances compared with other methods of producing a tubular fabric formation, such as knitting. However, whatever method is used for producing the tubular fabric formations for use in the composite element of the invention, the element can be manufactured to a particular size to a greater degree of accuracy than that achieved in the individual tubular fabric formations. This feature is inherent in the production of the composite element by assembling together separate tubular fabric formations. Thus, if a composite element is made by assembling 10 tubular fabric formations each having a circular cross-section and a tolerance ±1 mm on a diameter of 10 mm the resultant tolerance of the 10 tubular fabric formations assembled in a row is $$100 \text{ mm} \pm \frac{10 \text{ mm}}{\sqrt{10}},$$

that is 100 mm±3 mm. An accuracy of ±10% in the individual tubular fabric formations is thus transformed into an accuracy ±3% in the assembled composite element because of the spread of sizes and the fact that some are above and some below the target size.

Achievement of an accurate size in a composite element is important to permit automatic handling of the composite element and to allow it to be incorporated in structures where only low size tolerances are allowed.

Because of the size uniformity which can be achieved in producing separate tubular fabric formations, for example by braiding, such tubular formations can be shaped accurately to desired regular cross-sections and easily assembled together in desired, close-packed configurations in which the tubular formations have sides in contact or close proximity. Accuracy of dimensions in the component tubular formations of assemblies used in composite elements according to the invention assists in securing that applied loads are better shared between the tubular formation of the assembly with reduced risk that one tubular formation of an assembly will be subject to excessive load which might damage it.

Further, accurately dimensioned tubular formations are more easily handled by automated equipment during assembly operations.

Braided tubes used as separate tubular fabric formations in composite elements according to the invention may be made by a method involving procedures such as those described in British Patent Specification No. 1,053,747 which is concerned with resin-impregnating fabric tubing.

A composite element according to the present invention may include at least one tubular fabric formation shaped to a curved configuration. Advantageously, the shaping may be carried out when the tubular fabric formation is in a semi-stiff condition such that it can be bent to curve its longitudinal axis, leaving its cross-sectional shape substantially unaltered.

Figure 9:
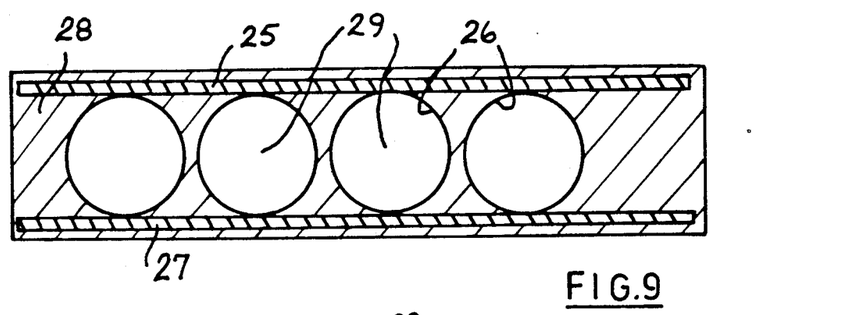
FIGS. 9 and 10 are diagrammatic cross-sections through two further composite elements according to the invention.

The composite element of FIG. 9 comprises a first layer 25 comprising parallel or substantially parallel continuous filaments impregnated with a synthetic resin, a second layer contiguous with the first layer (although the reinforcements in the two layers need not necessarily be in contact) and including an assembly of separate tubular fabric formations 26, and a third layer 27 also contiguous with the second layer and also containing parallel or substantially parallel continuous filaments. The reinforcing components (fabric and continuous filaments) are embedded in a synthetic resin 28 leaving the tubular formations 26 empty or full as desired. The tubular formations 26 are arranged with their longitudinal axes 29 parallel and at right angles to the direction of the continuous filaments in the layers 25 and 27, which extends from right to left in FIG. 9, that is the continuous filaments constitute an array of filaments in which the filaments extend transversely of the axes 29 of the tubular fabric formations 26. Each array of continuous filaments (or the array in a composite element comprising only one such array) may be in the form of a tape, band or sheet and such tape, band or sheet may be pre-impregnated with curable resin before incorporation in a composite element according to the invention. The continuous filaments in the arrays (when there are at least two arrays) may be aligned in different directions.

Figure 10:
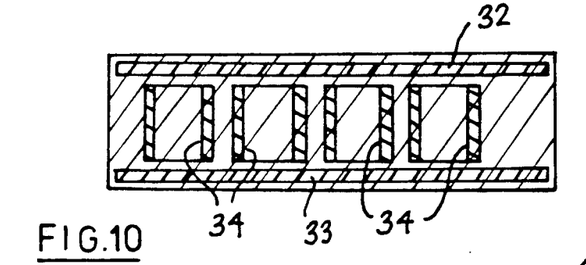

FIG. 10 shows a composite element in which two parallel layers 32 and 33 containing reinforcing fabric and/or filamentary elements and/or fibres have between them a layer comprising separate tubular fabric formations 34 arranged with their axes parallel to one another and extending transversely to, in this case perpendicular to, the layers 32 and 33. If the panel constituted by this composite element has a curved configuration, the tubular formations 34 each lie transversely to adjacent portions of the layers 32 and 33.

The tubular formations 26 in FIG. 9 are in load-bearing relationship with the layers 25 and 27 and the tubular formations 34 in FIG. 10 are in load-bearing relationship with the layers 32 and 33 so that forces acting at right angles to those layers, in each case, will impose compressive forces on the respective tubular formations.

Figure 11:
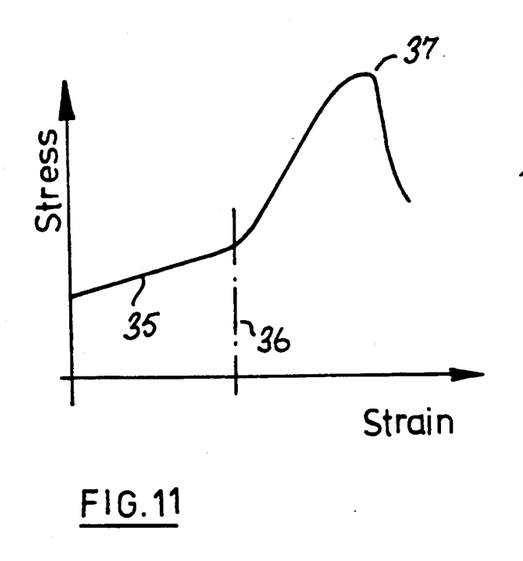
FIG. 11 is a stress-strain cruve of the composite element shown in FIG. 9.

The composite element of FIG. 10 will have a stress-strain curve, when subjected to forced at right angles to the layers 32 and 33, similar to that of FIG. 8 but the composite element of FIG. 9, which may also be a panel, will have a stress-strain curve, for the same direction of imposed forces, as shown in FIG. 11. Preferably, a polyurethane resin is used in composite elements to assist in obtaining such a curve. The initial part of the curve 35 represents initial deformation (that is flattening) of the tubular formations 26 until they become elliptical and at the line 36 touch. Initial spacing of the tubes with little or no resin or a very resilient resin between is thus advantageous. Resistance to deformation then increases with increasing load to a maximum 37 at which breakdown occurs.

Figure 12:
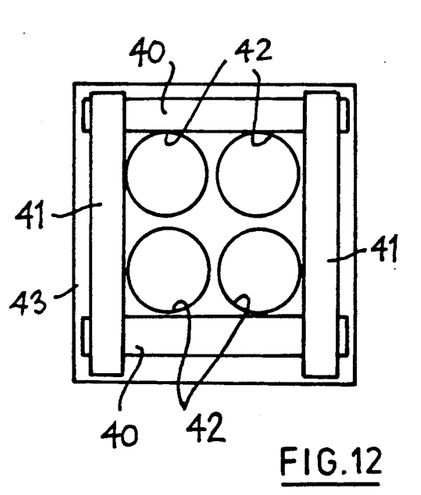
FIG. 12 is a diagrammatic cross-section through a further composite element according to the invention.

FIG. 12 shows a composite element comprising an assembly of separate tubular fabric formations 40, 41 and 42 extending in three dimensions in directions at right angles to one another and embedded in a block of synthetic resin 43.

Figures 13, 14:
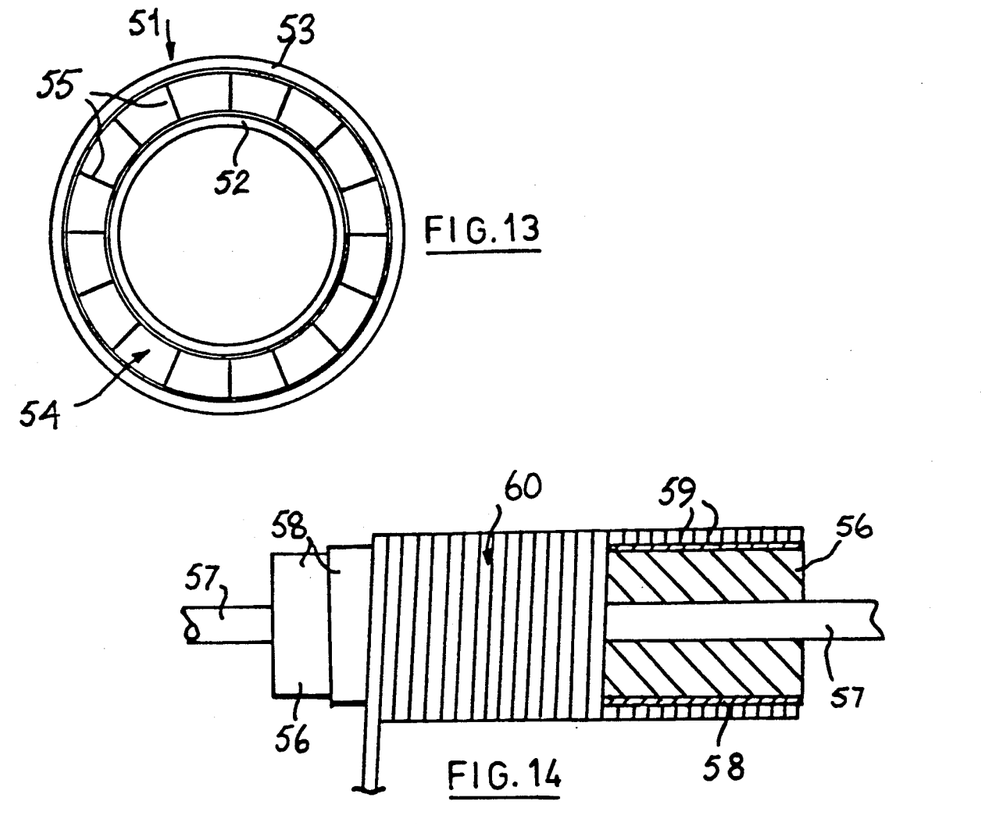
FIG. 13 is a cross-section through a composite element according to the invention which is tubular in shape and of a sandwich construction.
FIG. 14 is a part-section elevation showing a square-cross-section braided tube being filament-wound on a mandrel to form an assembly.

The tubular composite element 51 of FIG. 13 comprises inner and outer layers 52 and 53 of continuous filaments embedded in a resin matrix formed by filament winding, and an intermediate contiguous annular layer 54 comprising an assembly of fabric tubes 55 aligned with their axes parallel to the axis of the tubular element 51. Adjacent side walls of the fabric tubes are resin-bonded together and the assembly of tubes which make up the intermediate layer 54 is resin bonded to both the inner and outer filament-wound layer 52 and 53.

The fabric tubes used were originally held in a square-cross-sectional shape by a partly-cured resin size, but on assembly of the composite element and subsequent curing of the matrix resin, the square shape has been slightly distorted to a rhomboid shape.

The tubular composite element 51 is of circular cross-section. Other suitable cross-sections can be formed using the filament-winding technique including a square cross-section as shown in FIG. 5 of the drawings. The continuous filaments in the layers 52 and 53 may be supplemented or replaced by a bundle of filamentary elements or a length of fabric in sheet form.

In FIG. 14, a mandrel 56 is mounted on a rotary shaft 57. An inner layer 58 of continuous filaments embedded in a resin matrix has already been formed on the mandrel by filament-winding. A fabric tube 59 of square cross-section is shown partially-wound onto the inner layer 58 to form an assembly of tube windings which together provide a fabric framework 60. On completion of winding, the framework 60 of tube windings may be covered by an outer layer (not shown) similar to the inner layer 58 to form a tubular composite element of sandwich construction.

The tube 59 thus comprises a continuous tubular formation shaped to helical configuration so that parts of the tube (individial windings), which constitute separate tubular formations lie adjacent (in fact in contact) with one another.

The mandrel 56 is preferably of a collapsible structure to facilitate removal of the finished composite element.

Figure 15:
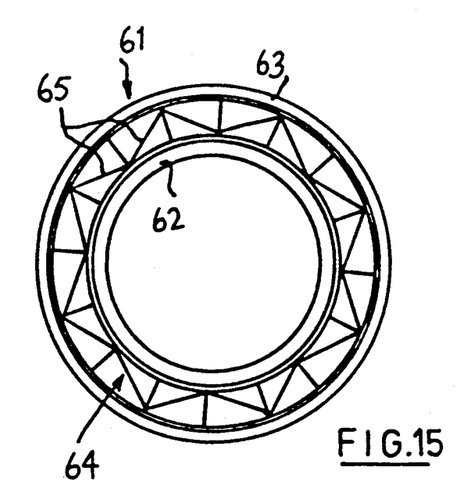
FIG. 15 is a similar cross-section to that shown in FIG. 14 but using triangular section tubes in a particular configuration.

In FIG. 15, the tubular composite element 61 comprises inner and outer layers 62 and 63 of continuous filaments embedded in a resin matrix formed by filament winding, and an intermediate annular layer 64 comprising an assembly of fabric tubes 65 aligned with their axes parallel to the axis of the tubular element 61. The fabric tubes 65 have the cross-section of a right-angled triangle and are arranged as shown with adjacent side walls resin-bonded together as an assembly of tubes. This assembly constitutes the intermediate annular layer 64 which is resin-bonded to both the inner and outer filament-wound layers 62 and 63.

Figure 16:
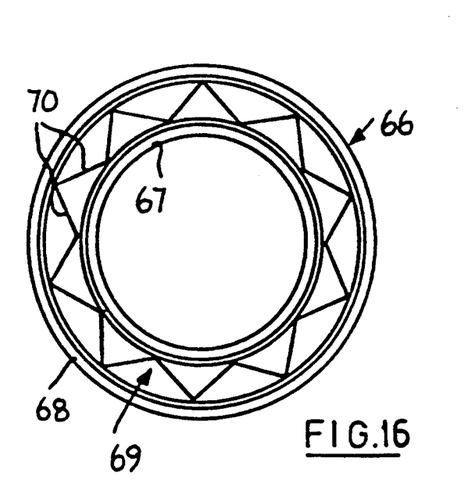
FIG. 16 is a similar cross-section to that shown in FIG. 15 using a different arrangement of triangular section tubes.

FIG. 16 shows a tubular composite element 66 comprising the same general construction of inner and outer layers 67 and 68 and an intermediate annular layer 69 comprising an assembly of fabric tubes 70 of triangular cross-section. In this case, however, the triangles are equilateral triangles and the tubes are arranged as shown.

What is claimed is:

1. A composite element comprising a plurality of separate hollow braided tubular fabric formations embedded in a cured or curable synthetic resin matrix assembled to form an assembly of contiguous structural elements, and a first layer connected to the said assembly of contiguous structural elements, said first layer comprising fabric in one or more of sheet form, continuous filaments and staple fibers embedded in a cured or curable synthetic resin.

2. A composite element according to claim 1, characterised in that at least some of the said braided tubular fabric formations are interconnected with one another.

3. A composite element according to claim 1, characterised in that at least some of the said braided tubular fabric formations are interengaged with one another.

4. A composite element according to claim 1, characterised in that the said first layer is connected to the said assembly of braided tubular fabric formations by resin bonding.

5. A composite element according to claim 1, characterised in that the said first layer contains continuous filaments which extend therein so as to lie adjacent to said assembly of braided tubular fabric formations.

6. A composite element according to claim 1 characterised in that at least some of the said separate braided tubular fabric formations are parallel to one another in the composite element.

7. A composite element according to claim 1, characterised in that the said first layer comprises an array of substantially parallel continuous filaments embedded in a synthetic resin matrix and the said assembly of separate braided tubular fabric formations includes separate braided tubular fabric formations having their axes parallel and disposed so that the said continuous filaments extend transversely of the said axes of the said separate braided tubular fabric formations.

8. A composite element according to claim 7, characterised in that the said array of continuous filaments is in the form of a tape of continuous filaments which have been pre-impregnated with a curable resin.

9. A composite element according to claim 1, characterised in that the said first layer is produced by winding one of a length of fabric in sheet form, a bundle of continuous filaments, a bundle of staple fibre threads, and a single continuous filamentary element, around the said assembly of separate braided tubular fabric formations.

10. A composite element according to claim 1, characterised in that the element comprises at least two containing filamentary elements.

11. A composite element according to claim 10, characterised in that the element comprises at least two layers having filamentary elements aligned in different directions.

12. A composite element according to claim 9, characterised in that the said first layer is produced by filament winding a bundle of one or more of continuous filaments, staple fibre threads, and a single continuous filamentary element, in a cross-band mode around the said assembly so that filamentary elements in successive layers lie in directions disposed at an angle to one another.

13. A composite element according to claim 6, characterised in that the element also comprises a third layer containing one of fabric in sheet form, contiguous filaments and staple fibres, embedded in a synthetic resin matrix, wherein said contiguous assembly of tubular formations forms a second layer which lies between the said first and third layers.

14. A composite element according to claim 13, characterised in that the separate braided tubular fabric formations of the said assembly of such formations in the said second layer are arranged in an annular configuration.

15. A composite element according to claim 13, characterised in that the said first and third layers have a planar form and lie parallel or approximately parallel to one another, and some at least of the separate braided tubular fabric formations of the said second layer are disposed with their longitudinal axes at least approximately parallel to the said first and third layers.

16. A composite element according to claim 13, characterised in that the said first and third layers have a planar form and lie parallel or substantially parallel to one another, and some at least of the separate braided tubular fabric formations of the said second layer are disposed with their longitudinal axes extending transversely to adjacent portions of the said first and third layers.

17. A composite element according to claim 15, characterised in that some at least of the said separate braided tubular fabric formations of the said second layer are in load-bearing relationship with the said first and third layers so that compressive forces acting at right angles to adjacent portions of the said first and third layers will impose compressive loads on such separate braided tubular fabric formations.

18. A composite element according to claim 14, characterised in that the said first and third layers comprise one of filament windings, bundles of continuous filaments, staple fibre threads and a single continuous filamentary element.

19. A composite element according to claim 1, characterised in that the element includes separate braided tubular fabric formations having a cross-section which is selected from square, triangular, rectangular, rhomboid and hexagonal form.

20. A composite element according to claim 19, characterised in that the element includes separate braided tubular fabric formations interconnected as parts of a continuous tubular formation which is shaped to a configuration such that the said parts lie adjacent one another.

21. A composite element according to claim 20, characterised in that the element comprises a spirally wound continuous braided tubular fabric formation sandwiched between inner and outer layers each consisting of one of fabric in sheet form, continuous filaments, and staple fibres, embedded in a synthetic resin matrix.

22. A composite element according to claim 1, characterised by a plurality of separate braided tubular fabric formations with longitudinal axes arranged at least approximately parallel to one another and having a resistance to compressive forces applied in the direction of the said longitudinal axes such that the stress-strain curve of the composite element in relation to such forces rises to a maximum and subsequently falls only to a small extent.

23. A composite element according to claim 1 wherein the separate tubular fabric formations are assembled so that their longitudinal axes extend in directions disposed in three dimensions.

24. A method of making a composite element, said method comprising the steps of making a number of at least semi-stiff separate hollow braided tubular fabric formations, assembling said braided tubular fabric formations to constitute a framework of such tubular fabric formations embedded in a cured or curable synthetic resin matrix and connecting a first layer to the framework, said first layer comprising fabric in one or more of sheet form, continuous filaments and staple fibers embedded in a cured or curable synthetic resin.

25. A method according to claim 24, characterised in that synthetic resin is applied to the said fabric framework after assembling the said separate braided tubular fabric formations.

26. A method according to claim 24, characterised by the step of making the at least semi-stiff separate braided tubular fabric formations by impregnating separated braided tubular fabric formations with a synthetic resin and at least partly curing the synthetic resin.

* * * * *

UNITED STATES PATENT OFFICE
CERTIFICATE OF CORRECTION

PATENT NO. : 5,108,810
DATED : April 28, 1992
INVENTOR(S) : Dennis J. Williams

It is certified that error appears in the above-identified patent and that said Letters Patent is hereby corrected as shown below:

Col. 11, line 27 (claim 10), before "containing", insert --layers--.

Col. 11, line 41 (claim 13), change "claim 6" to --claim 4--.

Col. 12, line 63 (claim 26), change "separated" to --separate--.

Signed and Sealed this

Thirty-first Day of August, 1993

Attest:

BRUCE LEHMAN

Attesting Officer    Commissioner of Patents and Trademarks